(No Model.) 2 Sheets—Sheet 1.

J. F. DAVES.
COMBINED AGRICULTURAL IMPLEMENT.

No. 318,171. Patented May 19, 1885.

Witnesses:
Chas. S. Hyw.
W. S. Odell

Inventor:
John F. Daves
By Emmorble atty (No Model.) 2 Sheets—Sheet 2.

J. F. DAVES.
COMBINED AGRICULTURAL IMPLEMENT.

No. 318,171. Patented May 19, 1885.

Witnesses:
Chas. S. Hyer.
W. S. Odell

Inventor:
John F. Daves.
By Emmarble
Atty.

UNITED STATES PATENT OFFICE.

JOHN FRANKLING DAVES, OF NEAR TUPELO, MISSISSIPPI.

COMBINED AGRICULTURAL IMPLEMENT.

SPECIFICATION forming part of Letters Patent No. 318,171, dated May 19, 1885.

Application filed October 9, 1884. (No model.)

*To all whom it may concern:*

Be it known that I, JOHN F. DAVES, a citizen of the United States, residing near Tupelo, in the county of Lee and State of Mississippi, have invented certain new and useful Improvements in Combined Agricultural Implements, of which the following is a specification, reference being had to the accompanying drawings.

My invention relates to a combination agricultural implement; and it consists in certain details of construction, which will be more fully hereinafter described, and pointed out in the claim.

The object of my invention is to form from one device a series of cultivating implements by a change of parts forming the same, and thereby obtaining any one of the series desired. Another object of my invention is to construct a combined cultivator which, by its utility, will be easily handled in the field, and one in which expense will be greatly lessened. I obtain these objects by the mechanism illustrated in the accompanying drawings, wherein like letters of reference refer to similar parts, and in which—

Figure 1:
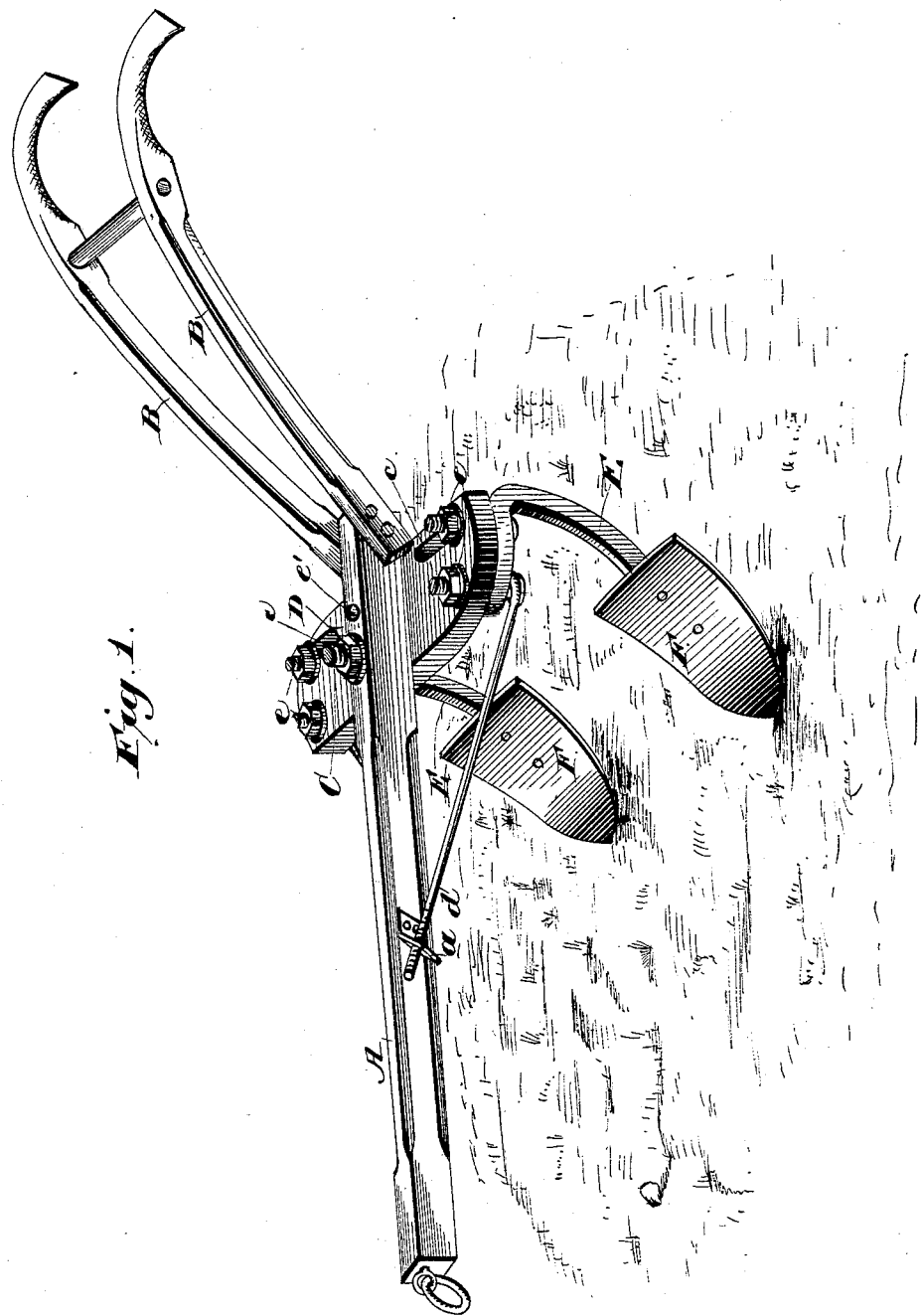
Figure 2:
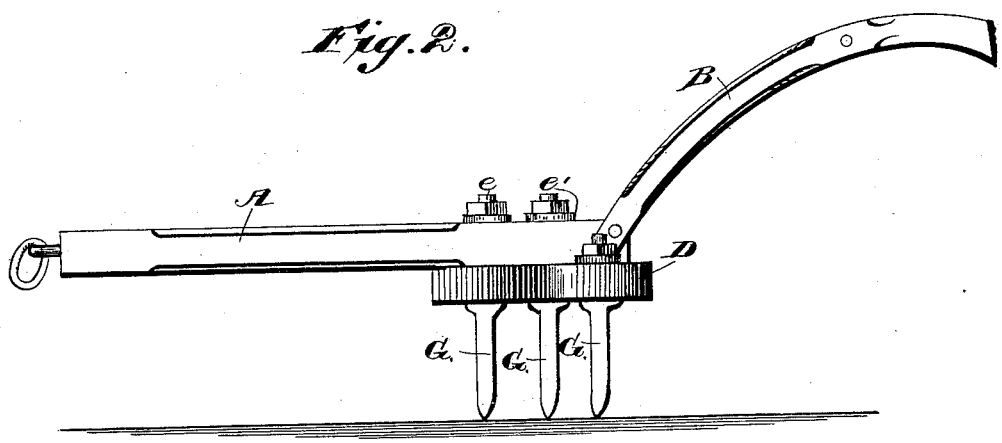

Figure 1 is a perspective view of my device arranged as a straddle-plow. Fig. 2 is an elevation of the same arranged as a side harrow, and Fig. 3 a like view showing my device constructed in the form of a single shoe or shovel plow.

A represents an ordinary plow-beam, to which are fastened the usual handles, B B, and having also the ordinary draft-clevis. To the beam A a cross-beam, D, is secured, as shown in Figs. 1 and 2, by means of a king-bolt, C. Through this cross-beam D are cut suitable slots and holes for the reception of the bolts on the various implements to be interchanged.

In Fig. 1 the device is shown arranged as a straddle-plow or double cultivator. To the cross-beam D are secured feet E E, to which are fastened in the usual manner shovels or shoes F F. The feet or standards E E are secured to said cross-beam D by bolts and nuts $e\ e$, and are adjustable in the slots $c$, as shown.

In Fig. 2 a side harrow is shown as attached to the beam A through the medium of cross-beam D. The teeth G G G are of the usual form, and secured in the same manner as the shovels and feet E and F, by bolts and nuts. In this instance the central hole or slot, $e'$, in the beams A and D, is used, thus making, by inserting a tooth therein, a continuous line of said teeth.

Figure 3:
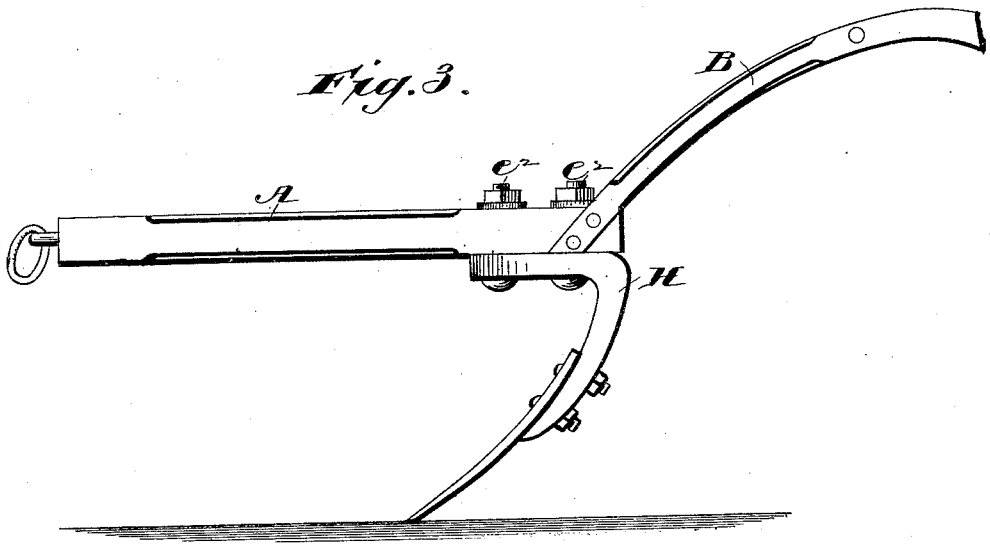

In Fig. 3 a single shovel-plow is shown as constructed from the same implement as shown in Fig. 1. The foot or standard H is secured directly to the beam A by removing the cross-beam D by means of suitable bolts and nuts $e^2\ e^2$. Brace-rods $d\ d$, attached to the beam D, and then secured rigidly or having free movement in ears $a$ on beam A, as shown in Fig. 1, are used in any of the variations when necessary.

The operation of my improved combined cultivator is as follows: To convert the implement shown in Fig. 1 to that shown in Fig. 2, the bolts and nuts $e\ e$ are removed, thus releasing the feet E E with their shoes or shovels F F. The cross-beam D will now be free from any mechanism, and be securely held by the king-bolt C, as shown. The cross-beam D will then be provided (by insertion through its slots and holes) with harrow-teeth G G G, of any construction and form suitable for side harrow purposes. These teeth G are held in position by the bolts and nuts $e\ e$, passing through the slots or holes in the said cross-beam D. By putting a tooth in the slot $e'$, Fig. 1, the cross-beam D is more securely braced, the said bolt passing through slot $e'$, acting in conjunction with the king-bolt C, thus allowing, if desired, the removal of the brace-rods $d\ d$.

To construct the single-shovel plow or cultivator shown in Fig. 3 from the device illustrated in Fig. 1, the cross-beam D is removed entirely from the main beam A, leaving the ordinary form of plow-beam. A foot, H, is secured to the beam A by bolts and nuts $e^2\ e^2$, one of these bolts occupying the place of the king-bolt C and the other passing through hole $e'$. To this foot H a shoe is applied, as shown, and which is well known in the arts.

In all these implements shown the same handles B B are used for every one, being attached rigidly to the main beam A, and thus not interfering with any of the interchanged parts.

It is obvious that any other well-known implements besides those shown can be attached to this device by merely making a slight change in the arrangement of the bolts and nuts or by removal entirely of the cross-beam. These and other changes can be made without materially departing from the nature of my invention and the principle involved therein.

I am aware that devices have been constructed whereby changes can be made from a plow to a cultivator, and vice versa; but such devices have generally been crude and unwieldy.

Having thus described my invention, what I claim as new, and desire to secure by Letters Patent, is—

A combined agricultural implement, comprising the main beam A, having handles B B, secured thereto, cross-beam D, having slots $c$, and secured to the main beam by king-bolt C, adjusting screw-threaded braces $d\ d$, and the nuts and bolts for attaching interchangeably the braces and the cultivator-standards E E and H, shoes or shovels F F, and teeth G G G, all constructed and arranged to operate substantially as described, and for the purposes as set forth.

In testimony whereof I affix my signature in presence of two witnesses.

JOHN FRANKLING DAVES.

Witnesses:
F. M. GOUR,
W. D. ANDERSON.